United States Patent [19]

Younger et al.

[11] Patent Number: 4,787,782

[45] Date of Patent: Nov. 29, 1988

[54] OPEN MESH DEVICE FOR IMPROVED IN-CAR SLURRYING

[75] Inventors: Ronald L. Younger; John S. Coulter, both of Athens, Tenn.

[73] Assignee: J. M. Huber Corporation, Rumson, N.J.

[21] Appl. No.: 108,906

[22] Filed: Oct. 13, 1987

[51] Int. Cl.$^4$ .......................................... G65G 53/30
[52] U.S. Cl. ...................... 406/46; 406/48; 406/138
[58] Field of Search ............... 406/46, 38, 47, 39, 48, 406/121, 134, 136, 138, 137, 169, 181, 197, 198; 114/73; 366/101

[56] References Cited

U.S. PATENT DOCUMENTS

| | | | |
|---|---|---|---|
| 1,351,026 | 8/1920 | Jenkins | 406/39 |
| 2,609,185 | 9/1952 | Eisner | 406/136 |
| 3,006,693 | 10/1961 | Claunch, Jr. et al. | 406/170 |
| 3,198,492 | 8/1965 | Schneider | 366/107 |
| 3,276,753 | 10/1966 | Solt et al. | 366/107 |
| 3,481,116 | 12/1969 | Ferri | 406/39 |
| 3,671,018 | 6/1972 | Tjebbes | 406/39 |
| 4,189,262 | 2/1980 | Anderson | 406/136 |
| 4,505,214 | 3/1985 | McKibben | 366/107 |

Primary Examiner—Joseph F. Peters, Jr.
Assistant Examiner—Edwin L. Swinehart
Attorney, Agent, or Firm—Harold H. Flanders; Robert L. Price

[57] ABSTRACT

A method and apparatus for improved in-car slurrying of dry bulk powder in hopper cars is disclosed. The individual hopper car compartments have ports in the bottom therein for admitting air under pressure and water to form the slurry. The apparatus of this invention includes an open mesh disposed across the upper portion of the hopper car at about the level of the dry material. When air and water are pumped into the bottom of the hopper car compartment, the pumping action causes the dry material to impact the mesh whereby clumps thereof break up and become wetted. Air passes upwardly through the mesh then but clumps of unwetted powder do not. A central port is provided in the mesh for filling the compartment with dry bulk powder.

6 Claims, 2 Drawing Sheets

OPEN MESH DEVICE FOR IMPROVED IN-CAR SLURRYING

FIELD OF THE INVENTION

This invention is directed to the movement of bulk pulverulent materials and in particular to the slurry unloading of dry bulk powder from railroad hopper cars or the like.

BACKGROUND OF THE INVENTION

The shipment of dry bulk powder materials in, for example, railroad hopper cars results in settling or compacting of the materials. When materials such as amorphous sodium alumino silicate pigments arrive at a users plant various methods have been proposed for moving the pigment from the railroad hopper car to storage facility for subsequent use.

In U.S. Pat. No. 3,512,842 owned by the assignee of this invention, it was proposed to introduce warm water into the dry bulk powder to form a slurry. The particles would then wet out after a soaking period of several hours. Air was subsequently interjected into the slurry to facilitate the formation of a homogeneous slurry which would be suitable for pumping. Air was introduced through pipes mounted along the sides and bottom of the hopper with multiple holes spaced for expelling air under pressure. Typically the pipes were one half inch in diameter with 3/16 inch holes spaced about one foot apart and air pressure of 80 to 100 pounds per square inch (gauge) was used.

Water at a temperature of between 73° F. and 100° F. was introduced at the bottom of the hopper at a low controlled rate to make up a slurry containing about 2.3 to 2.4 pounds of sodium alumino silicate per gallon.

The patent further states that after air agitation, the slurry is recycled by pumping the slurry from the bottom of the hopper car and returning it to the top to further assist in forming a homogeneous slurry. The slurry then can be pumped to a storage tank for use later in the plant.

This procedure requires high capacity pumps. While at rest the slurry material often became a jelly-like material requiring further agitation to become fluid. In addition, a concentration in excess of about 2.4 pounds per gallon has such a high viscosity that pumping was difficult.

Subsequently, in U.S. Pat. No. 4,036,663, also assigned to the assignee of this invention, an alternate procedure was proposed wherein a finely divided deliquescent salt was admixed with the dry powder before water was admitted. The salt was typically blended in a weight range of about 0.1% to 3% by weight of the pigment mixture before slurrying. While this procedure was effective, it increased the cost of the pigment and required a facility for the dry mixing step.

A further effort to improve the off loading of dry powder is described in U.S. Pat. No. 4,189,262. In that patent a plurality of aeration devices are mounted in the bottom of the hopper. The aeration devices were as disclosed in U.S. Pat. No. 3,929,261 and included a head with a movable flap which fluttered as air passed through the head and into the surrounding powder material.

Problems remain however in circulating the water admitted at the bottom of the hopper upwardly through the packed bulk material without bypassing clumps which are not subsequently broken up or by caking of the material at the top.

Typically when water is admitted at the bottom of the hopper compartment it will meander upwardly through the packed mass of dried material and can cause some of said material to float or cake in the upper portion of the hopper. Air agitation is only partially effective in this instance in breaking up the floating cake.

SUMMARY OF THE INVENTION

It has been discovered however that a mesh disposed in the upper portion of the hopper car is highly effective in preventing the floating cake and, with air agitation, will effectively breakup clumps of unwetted material as the material is pumped upwardly into the mesh, but still will permit the passage of air. In a preferred embodiment of this invention the mesh is of stainless steel and comprises an open area of about 65% with mesh squares on one inch center to center.

Obviously, in order to load the hopper car with the mesh installed, there must be a port in the mesh. Accordingly, a hole about 30 inches in diameter is centered on the main loading hatch. It has been discovered that the effectiveness of the mesh in breaking up clumps of unwetted material is not diminished by the presence of the open port.

Accordingly it is an object of this invention to provide a means for assisting in the formation of a slurry of bulk powder material to facilitate the unloading thereof from railroad hopper cars.

It is another object of this invention to provide a mesh covering the dried material which will prevent the material from forming a floating cake, and with air agitation will assist in breaking up clumps of unwetted material without restricting the passage of air.

DETAILED DESCRIPTION OF THE INVENTION

Figure 1:
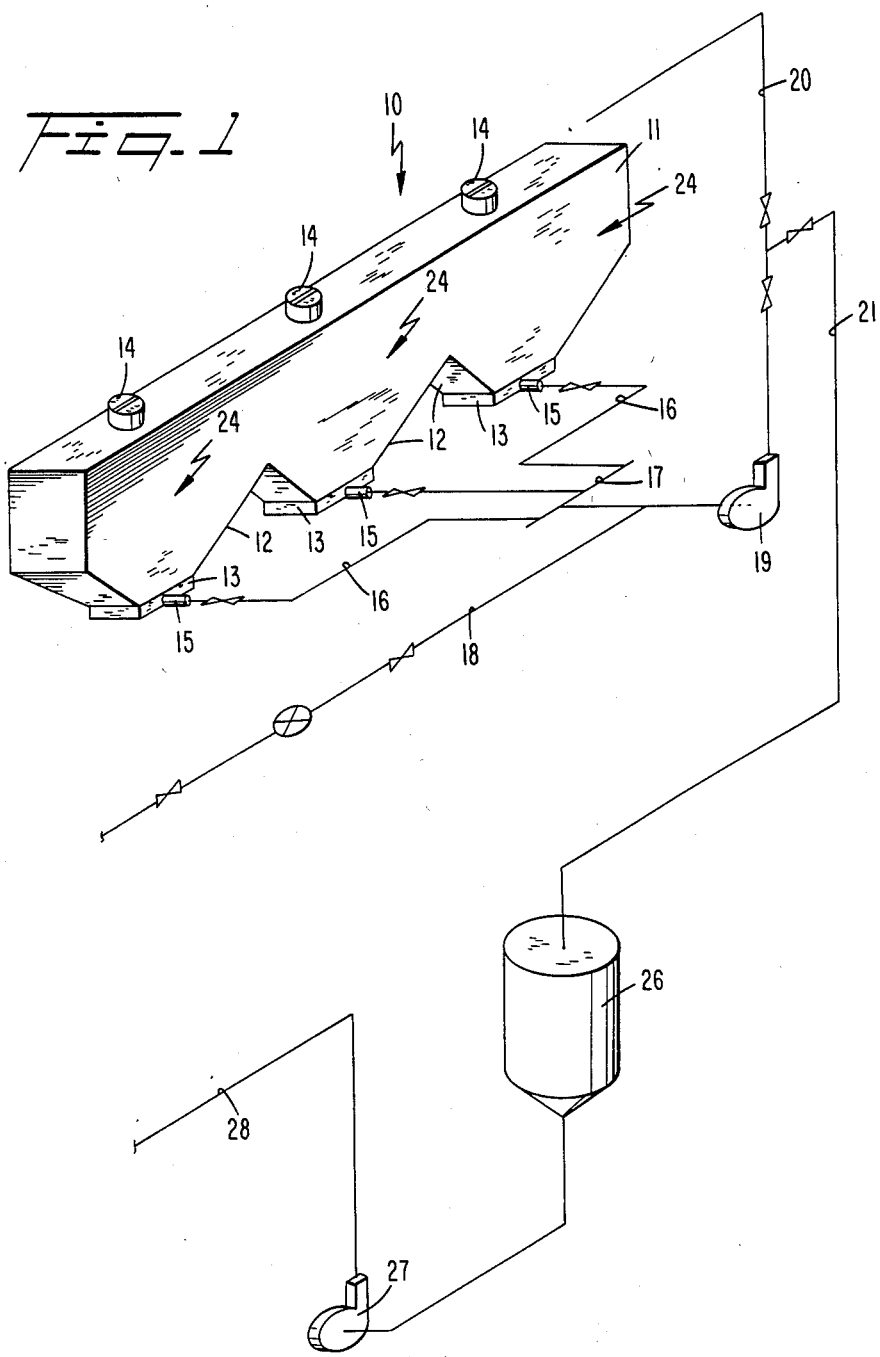
FIG. 1 is a schematic view of a hopper car with associated piping for unloading a slurry.

FIG. 1 is a schematic showing the system generally used to slurry unload dry bulk powder shipments. That system is similar to that disclosed in U.S. Pat. No. 3,512,842 and accordingly the disclosure of that patent is hereby incorporated by reference. The instant invention is intended to be either a modification of or an addition to this system as will be subsequently explained.

Referring to FIG. 1, a typical railroad hopper car 10 is intended to be modified according to the following description.

The hopper car 10 generally has a body 11 and a plurality of hoppers 12 depending therefrom. The hoppers 12 have generally rectangular boxes 13, and the car is provided with filling domes 14 to give access to the interior 11 of the car for filling with a dry powder material.

A pipe coupling 15 is provided in box 13, and coupling 15 is intended to be attached to water line 16 during the slurry process. As will be obvious to those skilled in the art appropriate valves are provided in line 16. Conduits 16 extend from a manifold 17 which in turn is fed by a water line 18. A pump 19 is connected to manifold 17 and is adapted to pump slurry through a recycle line 20 or a product line 21 which extends to a storage tank 26. Storage tank 26 is connected to pump 27 for pumping the slurry through line 28 to its point of use in the plant.

The water supply line 18, as will be obvious to those skilled in the art can be provided with a water meter and a temperature gauge when warm water is to be used.

Typically a pneumatic agitator system is provided within each hopper 12 fed by conduits 24 which connect the pneumatic aeration system as will be subsequently described, with a remote source of compressed air (not shown). The pneumatic system described in the above identified patent included a plurality of pipes disposed along the sides and bottom of the hopper with a plurality of air outlets therein. That system can be used with that of the instant invention if desired.

When water was admitted to the hoppers 12 through couplings 15 even with air agitation through conduits 24, as the water rose it tended to meander through the powder material leaving pockets or clumps of dry materials which even in an overnight soak would not wet out. Recycling was somewhat effective in breaking up these "clumps".

Figure 2:
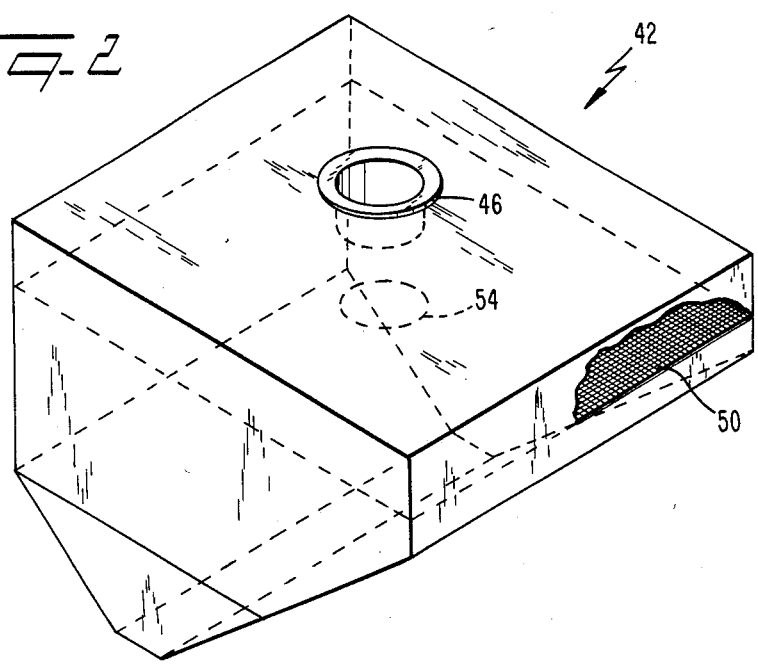
FIG. 2 is a perspective view of a hopper car with the mesh of this invention.
Figure 3:
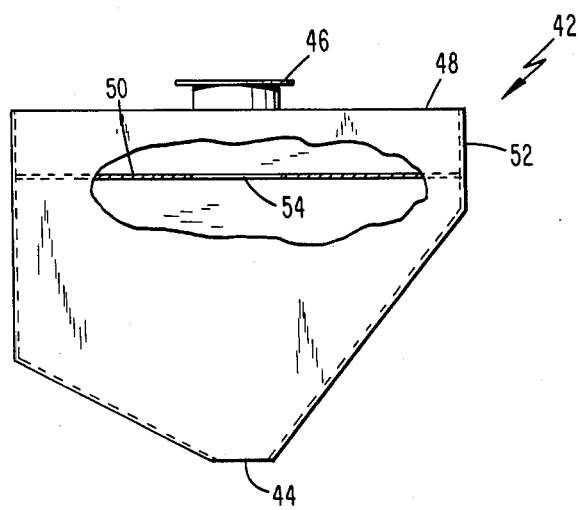
FIG. 3 is a side view of the hopper car of this invention.

With attention to FIGS. 2 and 3, there is depicted therein a representation of a hopper compartment. The means for air agitation, water inlet, and slurry outlet as well as the loading hatch have been removed for clarity. Water and/or air agitation would be admitted however into the bottom 44 of the compartment and the inlet port 46 in the top 48 would be open to permit air to exit the compartment 42.

The mesh 50 of this invention is disposed in the upper portion 52 of compartment 42 to be at or slightly above the level the dry material would occupy in the compartment after settling. In other words, the mesh is intended to be disposed above the dry powder material when the slurry is formed but close enough to the surface thereof so that with air agitation unwet clumps of the material will impact the mesh and break up.

In order to facilitate filling the compartment 42, a port 54 is provided in the mesh 50. The port 54 preferably is 30 inches in diameter and centered on the main loading hatch 46.

The mesh preferably is a stainless steel mesh with a mesh per linear inch of approximately one inch center to center and a total open area of about 65%. As will be obvious to those skilled in the art, this invention is not intended to be limited to the type of mesh so long as the mesh is sufficiently open to permit the passage of air so that air admitted at the bottom of car 42 for agitation, can pass upwardly through the contents of the compartment to exit at hatch 46. Air agitation of the water mixture then in combination with the mesh produces a homogeneous slurry which may be then pumped from the hopper car to a storage facility.

The invention may be embodied in other specific forms without departing from the spirit or essential characteristics thereto. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A method for improved in-car slurrying of dry bulk powder contained in hopper compartments in a hopper car, each compartment having means for admitting air under pressure and water into the compartment at the bottom thereof comprising the steps of:
 - providing a porous obstruction across the upper portion of the compartment at about the level of the bulk powder therewithin which will admit the passage of air therethrough but not clumps of unwet powder,
 - admitting water and air to the bottom of the bulk to pump said material upwardly against said obstruction.

2. The method of claim 1 wherein said obstruction is an open mesh.

3. The method of claim 1 wherein the open mesh further defines a central port for filling the compartment therebelow with dry powder.

4. The method of claim 2 wherein the mesh is stainless steel.

5. The method of claim 2 wherein the mesh comprises about 65% open area.

6. The method of claim 2 wherein the mesh comprises squares having centers about one inch apart.

* * * * *